US008032287B2

(12) United States Patent
Nozaki et al.

(10) Patent No.: US 8,032,287 B2
(45) Date of Patent: Oct. 4, 2011

(54) CONTROL APPARATUS OF DRIVING SYSTEM FOR VEHICLE

(75) Inventors: Yuji Nozaki, Yokohama (JP); Shoji Kan, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 884 days.

(21) Appl. No.: 12/041,086

(22) Filed: Mar. 3, 2008

(65) Prior Publication Data
US 2008/0220937 A1 Sep. 11, 2008

(30) Foreign Application Priority Data
Mar. 6, 2007 (JP) ................... 2007-055202

(51) Int. Cl.
B60K 6/54 (2007.01)
B60K 6/46 (2007.01)
(52) U.S. Cl. .......................................... 701/54; 477/107
(58) Field of Classification Search .................... 701/54; 477/107
See application file for complete search history.

(56) References Cited

U.S. PATENT DOCUMENTS

| | | | | |
|---|---|---|---|---|
| 4,502,354 A | * | 3/1985 | Suzuki et al. ................. | 477/155 |
| 4,793,216 A | * | 12/1988 | Hiramatsu et al. ............ | 477/148 |
| 4,953,090 A | * | 8/1990 | Narita ............................ | 701/66 |
| 4,998,449 A | * | 3/1991 | Baba et al. ..................... | 477/98 |
| 5,072,390 A | * | 12/1991 | Lentz et al. .................... | 701/60 |
| 5,213,186 A | * | 5/1993 | Murata .......................... | 477/169 |
| 5,588,937 A | * | 12/1996 | Kono et al. .................... | 477/169 |
| 5,772,557 A | * | 6/1998 | Tasaka et al. ................. | 477/162 |
| 5,833,570 A | | 11/1998 | Tabata et al. | |
| 6,176,812 B1 | * | 1/2001 | Taki et al. ..................... | 477/159 |
| 6,584,394 B2 | * | 6/2003 | Takatori et al. ................ | 701/55 |
| 2002/0116109 A1 | * | 8/2002 | Takatori et al. ................ | 701/55 |
| 2004/0162184 A1 | * | 8/2004 | Segawa et al. ................. | 477/62 |
| 2005/0222734 A1 | * | 10/2005 | Akaike .......................... | 701/51 |
| 2005/0288147 A1 | * | 12/2005 | Endo et al. ....................... | 477/5 |

FOREIGN PATENT DOCUMENTS
JP HEI 10-257610 9/1998
* cited by examiner

*Primary Examiner* — Mark Hellner
*Assistant Examiner* — Ari M Diacou
(74) *Attorney, Agent, or Firm* — Young Basile (57) ABSTRACT

A control apparatus for a vehicle that decreases shift shock generated by full engagement of a clutch at completion of an inertia phase. The apparatus includes a driving source, a step automatic transmission arranged to attain a predetermined shift stage by engagement of frictional engagement elements, a rotational speed control to control the driving source so that an input rotational speed of the transmission becomes a predetermined target value during the inertia phase, a torque control to control the driving source so that the input torque of the transmission becomes a predetermined target value during the non-inertia phase, and a torque correction to correct the engagement torque of the engagement element or the input torque of the transmission so that the engagement torque of the engagement element before completion of the inertia phase is substantially identical to the input torque of the transmission after completion of the inertia phase.

20 Claims, 9 Drawing Sheets

CONTROL APPARATUS OF DRIVING SYSTEM FOR VEHICLE

CROSS REFERENCE RELATED TO APPLICATION

This application claims priority to Japanese Patent Application Serial No. 2007-055202, filed Mar. 6, 2007, which is incorporated herein in its entirety by reference.

TECHNICAL FIELD

This invention relates to a control apparatus of a driving system for a hybrid vehicle arranged to obtain a driving force by an engine and a motor-generator.

BACKGROUND

In a conventional hybrid vehicle, a rotation feedback control of a motor-generator is performed to decrease a shift shock so that an input rotation speed corresponds to a target rotation speed during an inertia phase during which the input rotational speed varies in accordance with the shift. Japanese Patent Application Publication No. 10-257610 teaches one such rotation feedback control.

BRIEF SUMMARY

One embodiment of a driving system for a vehicle taught herein comprises a driving source; a step automatic transmission arranged to attain a predetermined shift state by selecting an engagement state of a frictional engagement element and to transmit a driving force of the driving source to driving wheels, a vehicle running state sensing device configured to sense a running state of the vehicle and a control device configured to output a respective control command value to the driving source and the step automatic transmission in accordance with the running state. The control device in this example includes a rotational speed control section configured to control a rotational speed of the driving source so that an input rotational speed of the step automatic transmission follows a target rotational speed during an inertia phase during which the input rotational speed of the step automatic transmission varies in accordance with a shift, a frictional engagement force control section configured to control an engagement force of the frictional engagement element during the inertia phase, a driving force control section configured to control a driving force input to the step automatic transmission after the inertia phase in accordance with the running state, a driving force difference judgment section configured to judge whether or not a driving force difference input to the step automatic transmission that is equal to or greater than a predetermined value is generated before or after completion of the inertia phase and a frictional engagement force correction section configured to selectively correct the engagement force so as to decrease the driving force difference when the driving force difference that is equal to or greater than the predetermined value is generated.

Embodiments of a control apparatus and control method of a driving system for a vehicle are also taught herein. The vehicle includes a driving source and a step automatic transmission arranged to attain a predetermined shift state by selecting an engagement state of a frictional engagement element and to transmit a driving force of the driving source to driving wheels. One embodiment of a control apparatus comprises means for outputting a respective control command value to the driving source and the step automatic transmission in accordance with the running state, means for controlling a rotational speed of the driving source so that an input rotational speed of the step automatic transmission follows a target rotational speed during an inertia phase during which the input rotational speed of the step automatic transmission varies in accordance with a shift, means for controlling an engagement force of the frictional engagement element during the inertia phase, means for controlling a driving force input to the step automatic transmission after the inertia phase in accordance with a sensed running state, means for judging whether or not a driving force difference input to the step automatic transmission that is equal to or greater than a predetermined value is generated before or after completion of the inertia phase and means for selectively correcting the engagement force so as to decrease the driving force difference when the driving force difference that is equal to or greater than the predetermined value is generated.

One embodiment of a control method taught herein comprises outputting a respective control command value to the driving source and the step automatic transmission in accordance with the running state, controlling a rotational speed of the driving source so that an input rotational speed of the step automatic transmission follows a target rotational speed during an inertia phase during which the input rotational speed of the step automatic transmission varies in accordance with a shift, controlling an engagement force of the frictional engagement element during the inertia phase, controlling a driving force input to the step automatic transmission after the inertia phase in accordance with a sensed running state, judging whether or not a driving force difference input to the step automatic transmission that is equal to or greater than a predetermined value is generated before or after completion of the inertia phase and selectively correcting the engagement force so as to decrease the driving force difference when the driving force difference that is equal to or greater than the predetermined value is generated.

BRIEF DESCRIPTION OF THE DRAWINGS

The description herein makes reference to the accompanying drawings wherein like reference numerals refer to like parts throughout the several views, and wherein:

FIG. 2 is a skeleton diagram showing an automatic transmission AT;

DETAILED DESCRIPTION OF EMBODIMENTS OF THE INVENTION

In conventional art such as that described in Japanese Patent Application Publication No. 10-257610, shift shock may occur at the transition from the rotational feedback control region to the torque control region with termination of the inertia phase. That is, the clutch is in a slip state during the inertia phase, and accordingly the transmission output torque is dependent on the clutch torque. However, in the case of the full engagement of the clutch by the termination of the inertia phase, the transmission output torque is dependent on the transmission input torque. Accordingly, in a case in which there is a difference between the clutch torque and the transmission input torque at the time of termination of the inertial phase, the shift shock is generated by the full engagement of the clutch.

In contrast, embodiments of the invention decrease shift shock generated by a full engagement of a clutch by termination of an inertia phase.

Figure 1:
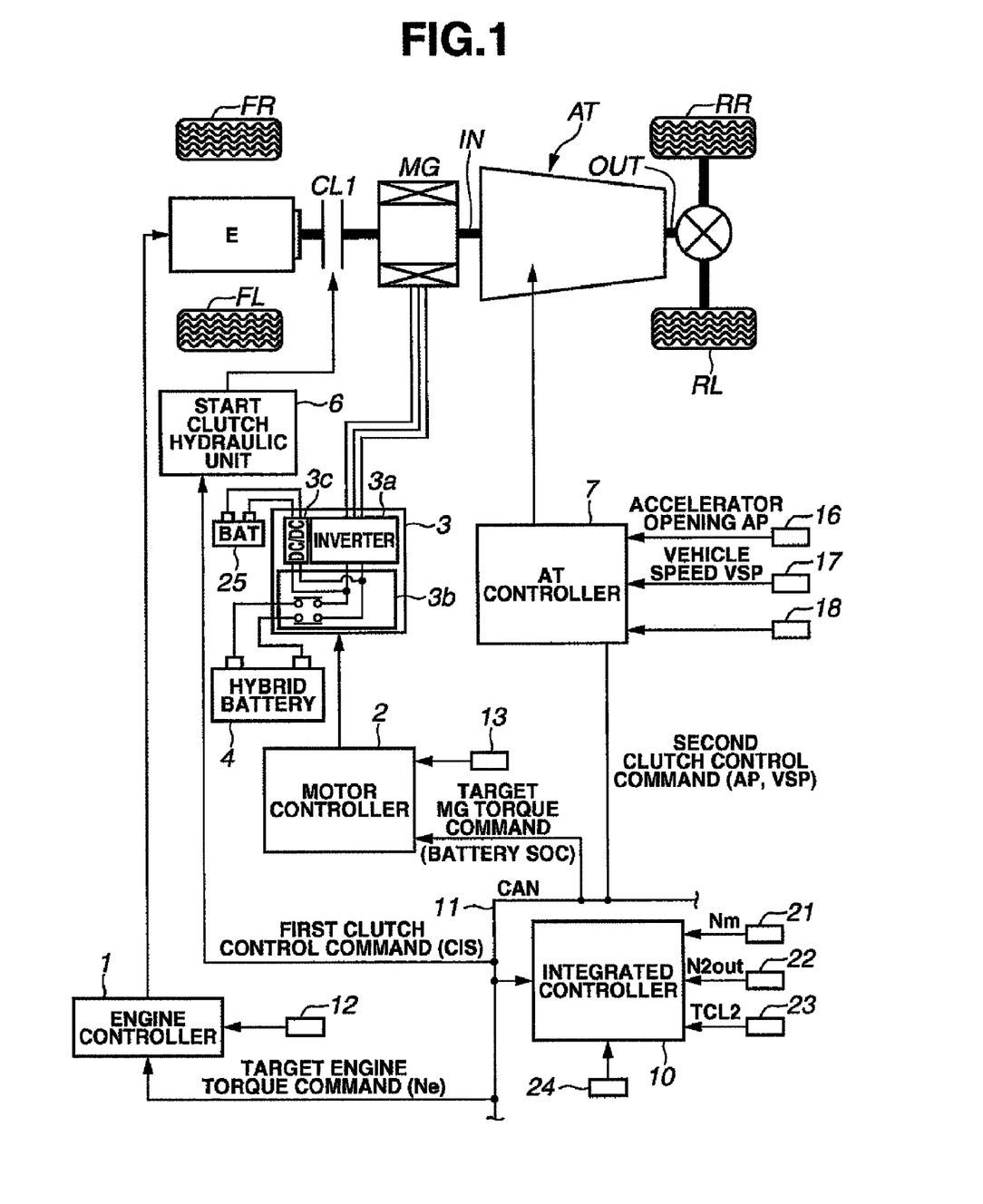
FIG. 1 is a system diagram showing a hybrid vehicle according to one embodiment of the invention.

FIG. 1 is a system diagram showing a hybrid vehicle according to a first embodiment of the invention. The hybrid vehicle according to the first embodiment includes an engine E, a motor-generator MG, a start clutch CL1, an automatic transmission AT, left rear wheel (driving wheel) RL and right rear wheel (driving wheel) RR. In addition, FL represents a left front wheel, and FR represents a right front wheel.

Engine E is a gasoline engine or a diesel engine. Valve openings and so on of throttle valves are controlled based on a control command from an engine controller 1.

Start clutch CL1 is interposed between engine E and motor-generator MG and is engaged and disengaged by a start clutch hydraulic unit 6 based on a control command from a start clutch controller (not shown).

Motor-generator MG is a synchronous motor-generator including a rotor in which permanent magnets are embedded and a stator on which stator coils are wound. The rotor serves as an output shaft and is connected with an input shaft IN of an automatic transmission AT. When driving, motor-generator MG is controlled by an inverter 3a of a power control unit 3 based on a control command from a motor controller 2.

This motor-generator MG acts as a motor when supplied with power from a battery (electric storage device) 4 and acts as a generator when motor-generator MG is rotated by an external force to charge battery 4.

Power control unit 3 includes inverter 3a, a high power circuit 3b and a DC/DC converter 3c. Inverter 3a includes semiconductor switching elements. Inverter 3a is arranged to convert a direct current of battery 4 to three-phase alternative current for output to motor-generator MG and is arranged to convert the three-phase alternative current from motor-generator MG to direct current for output to battery 4.

High power circuit 3b is disposed between battery 4, inverter 3a and DC/DC converter 3c and is arranged to break circulation of the electric power by a relay provided therein. DC/DC converter 3c decreases the voltage of battery 4 and supplies the low voltage to an auxiliary battery 25 (i.e., a power supply for lighting, display, auxiliary devices and so on).

Automatic transmission AT is a step transmission configured to switch shift stages automatically in accordance with a vehicle speed and an accelerator opening and so on. Automatic transmission AT is connected through an input shaft IN to the rotor of motor-generator MG and is connected through an output shaft OUT to left and right rear wheels RL and RR.

The hybrid vehicle includes two running modes. In EV mode, the vehicle runs only by a driving force of motor-generator MG. In HEV mode, the vehicle runs by the combined use of driving forces of motor-generator MG and engine E. The EV mode and the HEV mode are switched in accordance with the engagement/disengagement state of start clutch CL1 and the frictional engagement element in automatic transmission AT.

In a case in which start clutch CL1 is disengaged, the driving force of engine E is not transmitted to automatic transmission AT, and the vehicle is in the EV mode, running only by the power of motor-generator MG as the power source.

In a case in which start clutch CL1 is engaged, the driving force of engine E is transmitted through motor-generator MG and the frictional engagement element in automatic transmission AT. The vehicle is in the HEV mode, which commonly uses the driving forces of motor-generator MG and also engine E.

The HEV mode is further segmented by magnitudes and signs of driving force T(MG) generated by motor-generator MG.

First, where driving force T(MG) is zero, the vehicle is in an engine running mode and runs only by the driving force of engine E.

Second, where driving force T(MG) input from motor-generator MG to automatic transmission AT is a positive value, the vehicle is in a motor assist running mode and runs by commonly using the driving forces of motor-generator MG and engine E.

Third, where driving force T(MG) input from motor-generator MG to automatic transmission AT is a negative value, that is, in a case in which motor-generator MG does not generate the torque and is rotated by engine E or the vehicle inertia to consume external torque, motor-generator MG serves as the generator. Accordingly, battery 4 is charged. If the vehicle is in an acceleration state or constant speed running state, motor-generator MG is rotated by engine E to charge. If the vehicle is in a deceleration state, motor-generator MG is rotated by the vehicle inertia to charge.

As shown in FIG. 1, the hybrid vehicle includes engine controller 1, motor controller 2, power control unit 3, battery 4, an AT controller 7 and an integrated controller 10. They are connected with each other by CAN communication lines 11 capable of exchanging information with each other.

Engine controller 1 receives information regarding engine speed Ne from an engine speed sensor 12 and controls an engine operating point (Te: engine torque) in accordance with a target engine torque command and so on from integrated controller 10. Engine speed Ne is output through CAN communication lines 11 to integrated controller 10.

Motor controller 2 outputs, to power control unit 3, a command for controlling a motor operating point (such as motor-generator rotational speed N, motor-generator torque Tm) of motor-generator MG. The command is based on a rotary position of the rotor of motor-generator MG sensed by a resolver 13, a target motor-generator torque command (calculated by integrated controller 10, and so on.

Moreover, motor controller 2 monitors a battery state-of-charge (SOC) indicative of a charge state of battery 4. This battery SOC is used as information for controlling motor-generator MG and is supplied to integrated controller 10 through CAN communication lines 11.

AT controller 7 outputs a command for controlling the engagement/disengagement of the frictional engagement element in automatic transmission AT in accordance with sensor information from an accelerator opening sensor 16, a vehicle speed sensor 17 and a hydraulic pressure sensor 18 and the control command from integrated controller 10. The accelerator opening APO and vehicle speed VSP are supplied to integrated controller 10 through CAN communication lines 11.

Integrated controller 10 monitors energy consumption of the overall vehicle and operates to run the vehicle at maximum efficiency. Integrated controller 10 receives motor rotational speed Nm from a motor rotational speed sensor 21, a second clutch output rotational speed N2out from a second clutch output rotational speed sensor 22 and a second clutch engagement torque TCL2 from a second clutch engagement torque sensor 23 in addition to information obtained through CAN communication lines 11.

Integrated controller 10 outputs commands to engine controller 1, motor controller 2, start clutch controller and AT controller 7 to control engine E, motor-generator MG, start clutch CL1 and the frictional engagement element in automatic transmission AT. Each of the controllers 10, etc., is here implemented by, for example, a respective microcomputer including a random access memory (RAM), a read-only memory (ROM) and a central processing unit (CPU) in addition to various input and output connections. Generally, the control functions described herein and associated with each of the sections are performed by execution by the CPU of one or more software programs stored in ROM. Of course, some or all of the sections and their associated functions can be implemented by hardware components. While five controllers are described, more or fewer are also possible.

Figure 2:
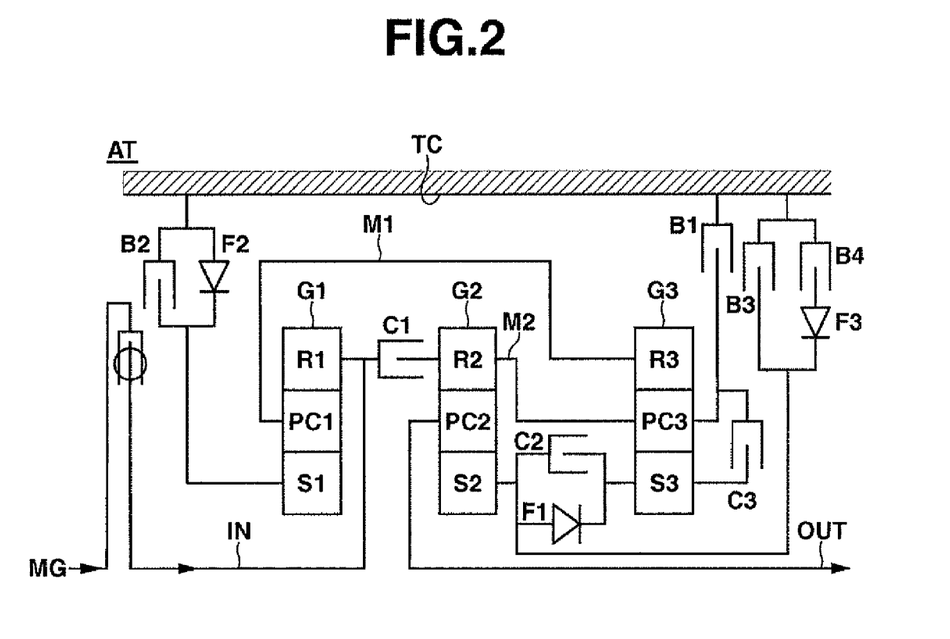

Referring now to FIG. 2, automatic transmission AT includes front, middle and rear planetary gears G1, G2 and G3 serving as rotational elements. Planetary gears G1, G2 and G3 include, respectively, sun gears S1, S2 and S3, carriers PC1, PC2 and PC3, and ring gears R1, R2 and R3 serving as rotational elements.

IN represents an input shaft to which a rotational driving torque is input from only motor-generator MG, or from engine E and motor-generator MG through the damper. OUT represents an output shaft that outputs the rotational driving torque through automatic transmission AT to left and right rear wheels RL and RR.

Engagement elements include an input clutch C1, a high & low reverse clutch C2, a direct clutch C3, a reverse brake B1, a front brake B2, a low coast brake 33, a forward brake B4, a first one-way clutch F1, a third one-way clutch F2 and forward one-way clutch F3. These engagement elements determine five forward speeds and one reverse speed.

Input clutch C1 connects front ring gear R1 with input shaft IN in a disengagement state and connects front ring gear R1 and middle ring gear R2 with input shaft IN in an engagement state. High & low reverse clutch C2 connects middle sun gear S2 and rear sun gear S3 when engaged. Direct clutch C3 connects rear sun gear S3 and rear carrier PC3 when engaged.

Reverse brake B1 fixes rear carrier PC3 to transmission case TC when engaged. Front brake B2 fixes front sun gear S1 to transmission case TC when engaged. Low coast brake B3 fixes middle sun gear S2 to transmission case TC when engaged. Forward brake B4 fixes middle sun gear S2 to transmission case TC when engaged.

First one-way clutch F1 fixes rotation of rear sun gear S3 in a forward direction (to equal the same rotational direction as engine E) with respect to middle sun gear S2, to freedom or reverse. Third one-way clutch F2 fixes the forward direction of front sun gear S1, to freedom or reverse. Forward one-way clutch F3 fixes the forward direction of middle sun gear S2, to freedom or reverse.

Output shaft OUT is directly connected to middle carrier PC2. Front carrier PC1 and rear ring gear R3 are directly connected by a first member M1. Middle ring gear R2 and rear carrier PC3 are directly connected by a second member M2.

Figure 3:
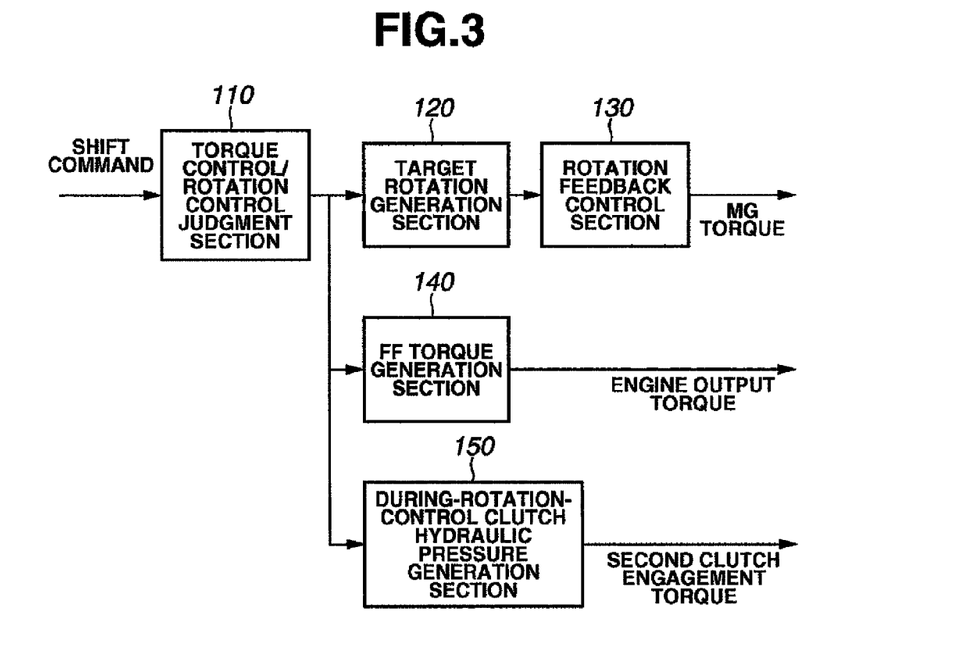
FIG. 3 is a block diagram of control of an engine E and a motor-generator MG that is performed in an integrated controller.

FIG. 3 is a control block diagram of engine E and motor-generator MG that is performed in integrated controller 10.

Torque control/rotation control judgment section 110 judges whether to perform torque control or rotational speed control based on a shift request from automatic transmission AT, a shift command from a driver and a shift state. Torque control/rotation control judgment section 100 outputs the judgment result to a target rotation generation section 120, a feed forward (FF) torque generation section 140 and a during-rotation-control clutch hydraulic pressure generation section 150.

Target rotation generation section 120 calculates a target input rotational speed of automatic transmission AT based on the judgment result. A rotation feedback control section 130 calculates an output torque of motor-generator MG based on the target input rotational speed.

FF torque generation section 140 calculates an engine torque based on the judgment result. During-rotation-control clutch hydraulic pressure generation section 150 calculates the engagement torque of a second clutch CL2, which is a frictional engagement element in automatic transmission AT and which is engaged in accordance with the shift.

Figure 4:
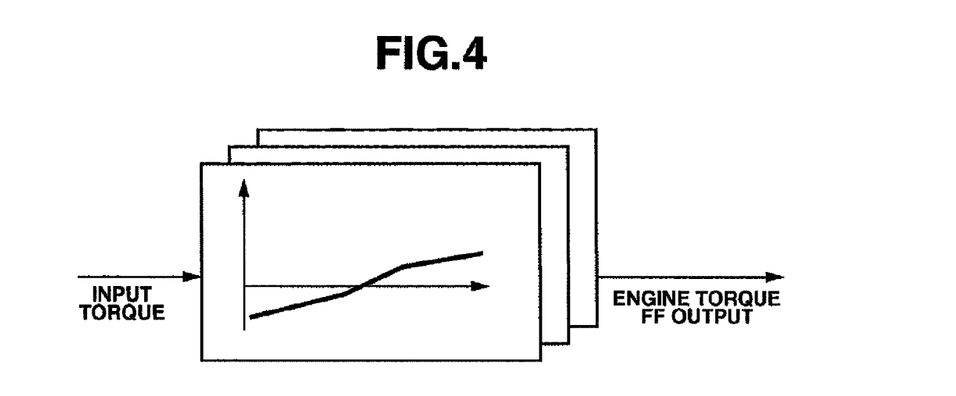
FIG. 4 is a map showing a required torque of the engine and an FF output in an FF torque generation section.

FIG. 4 is a map of the required torque of the engine and FF output in FF torque generation section 140, shown by example. This map is provided in each shift (shift such as 2-3 upshift) and sets FF output of the engine torque appropriately.

Figure 5:
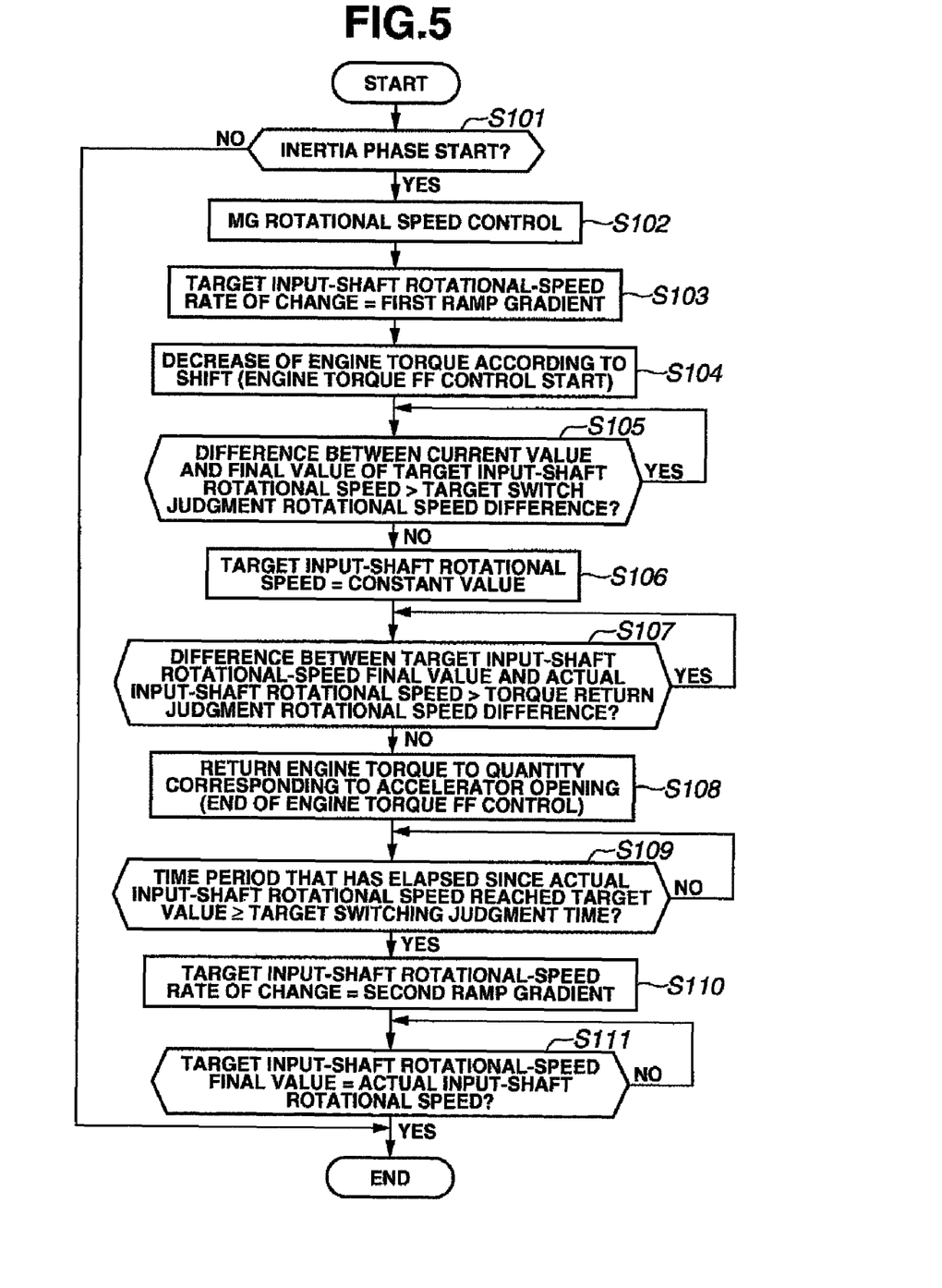
FIG. 5 is a flowchart showing flow of a torque control operation of the engine and the motor-generator during an inertia phase.

FIG. 5 is a flow chart showing a flow of the torque control operation of the engine and the motor-generator in the inertia phase.

Where the torque of the motor-generator is small with respect to the engine torque, it is not possible to follow the target rotational speed only by the torque of the motor-generator. Even in this case, in this example the engine torque is lowered by feedforward control, a rough torque profile is made by the engine torque, and then feedback control is performed by the motor-generator torque. Consequently, the control apparatus ensures the capability to follow the target input rotational speed of transmission AT. Hereinafter, each step is described.

Step S101 judges whether or not the vehicle shifts to the inertia phase. When the answer is YES, the process proceeds to step S102. When the answer is NO, the control is finished.

Step S102 brings motor-generator MG into rotational speed control, and then the process proceeds to step S103.

Step S103 sets the rate of change of the target input rotational speed to a first ramp gradient α, and the process proceeds to step S104.

Step S104 performs feed forward control of the engine torque to decrease the engine torque in accordance with the shift, and the process proceeds to step S105.

Step S105 judges whether or not an equation related to the actual value of the target input rotational speed is greater than an initial target rotational speed. When the answer is YES, the process repeats step S105. When the answer is NO, the process proceeds to step S106. More specifically, the initial target rotational speed is a threshold value to switch the rate of change of the target input rotational speed. The initial target rotational speed is set larger than the final value of the target input rotational speed by a constant rotation difference (called a target switch judgment rotation difference). Accordingly, where the actual (current) value of the target input rotational speed is lower than the initial target rotational difference, the rotation difference between the actual value and the final value of the target input rotational speed becomes lower than the target switch judgment rotation difference. In this case, the process advances to step S106.

Step S106 sets the target input rotational speed equal to a constant value, and the process proceeds to step S107.

Step S107 judges whether or not an equation related to the actual input rotational speed is greater than a torque return judgment threshold value. When the answer is YES, the process repeats step S107. When the answer is NO, the process proceeds to the step S108. More specifically, the torque return judgment threshold value is a threshold value to judge whether or not to return the engine torque to the accelerator opening. The torque return judgment threshold value is set larger than the final value of the target input rotational speed by a constant rotation difference (called a torque return judgment rotation difference). Accordingly, where the actual value of the input rotational speed is lower than the torque return judgment threshold value, the rotation difference between the actual value and the final value of the actual input rotational speed becomes lower than the torque return judgment threshold value. In this case, the process advances to step S108. The torque return judgment threshold value is larger than the initial target rotational speed of step S105.

Step S108 finishes the feedforward control of the engine torque, and returns the engine torque to the quantity corresponding to the accelerator opening. Then, the process proceeds to step S109.

Step S109 judges whether or not the time period elapsed since the actual input rotational speed reached the target input rotational speed is greater than or equal to a target switch judgment time period. When the answer is YES, the process proceeds to step S110. When the answer is NO, the process repeats step S109.

Step S110 sets the rate of change of the target input rotational speed to a second ramp gradient β, and the process proceeds to step S111.

Step S111 judges whether or not the actual input rotational speed equals the target input rotational speed final value. When the answer is YES, the control is finished. When the answer is NO, the process repeats step S111.

Figure 6:
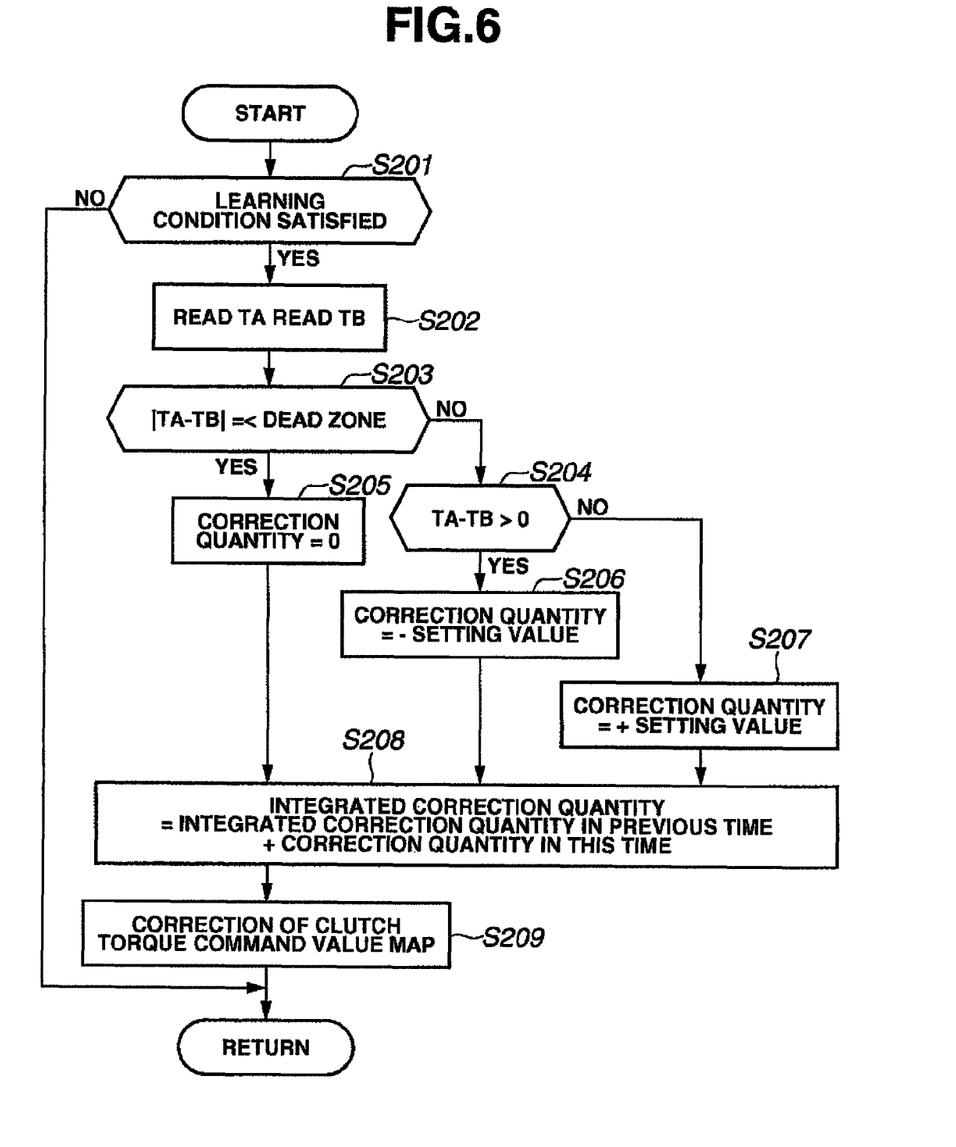
FIG. 6 is a flowchart showing learning control of a second clutch engagement torque TC in an inertia phase.

FIG. 6 is a flow chart showing learning control of engagement torque TC of the second clutch engaged at the shift in automatic transmission in the inertia phase.

In the rotation feedback control of motor-generator MG in the inertia phase, and the torque control of motor-generator MG after the inertia phase, learning control is performed so that engagement torque TC of the second clutch in the inertia phase becomes substantially identical to the input torque to automatic transmission AT after the inertia phase. Hereinafter, each step is described.

Step S201 judges whether or not learning conditions are satisfied. When the answer is YES, the process proceeds to step S202. When the answer is NO, the control is finished. In this embodiment, the learning conditions are represented by following three conditions:

1. an upshift by the accelerator opening of a constant value or more;
2. the hydraulic temperature is a constant value or more; and
3. motor-generator MG follows the target value during rotation feedback control.

In coasting running in which the accelerator opening is zero, the shift shock is low, and it is not necessary to perform learning control. Accordingly, condition 1 is set. Moreover, at a low temperature, the shift shock may become larger than the normal running state in a high temperature state since the viscosity of the oil is higher, and therefore learning control is inhibited. Moreover, for example, in a transient driving state in which the accelerator is suddenly depressed in the inertial phase, the motor-generator MG may not follow the target value. Accordingly, in this state, learning control is also inhibited.

Step S202 reads input torque TA to automatic transmission AT during rotation feedback control in the inertia phase, that is, second clutch engagement torque TC, and reads input torque TB to automatic transmission AT during the transition to torque control. The process then proceeds to step S203.

Figure 7:
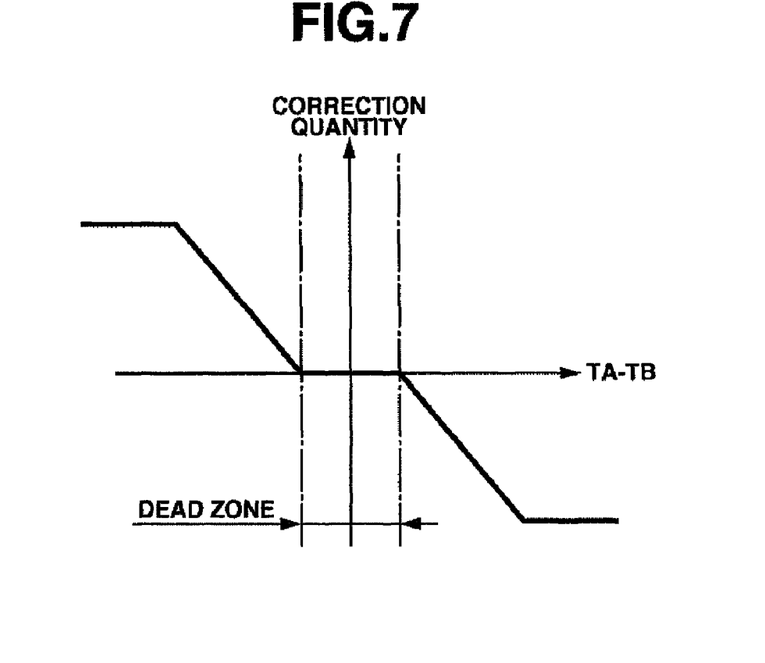
FIG. 7 is a view showing a dead zone region of difference between an automatic transmission input torque TA during a rotation feedback control and an automatic transmission input torque TB during torque control.

Step S203 judges whether or not an absolute value of difference TA−TB is in a dead zone region. When the answer is YES, the process proceeds to step S205. When the answer is NO, the process proceeds to step S204. In this case, it is judged whether or not the absolute value is in the dead zone region based on the map of FIG. 7.

Step S204 judges whether or not TA−TB>0. When the answer is YES, the process proceeds to step S206. When the answer is NO, the process proceeds to step S207.

Step S205 sets the correction quantity of second clutch engagement torque TC to zero. The process then proceeds to step S208.

Step S206 reverses a symbol of a setting value to set the correction quantity. That is, the correction quantity is set to −setting value. The process then proceeds to step S208.

In contrast, step S207 sets the setting value directly to the correction quantity. The process then proceeds to step S208.

Step S208 adds the current correction value to the integral correction value up to the previous control cycle to set the current integral correction value. The process advances to step S209.

Figure 8:
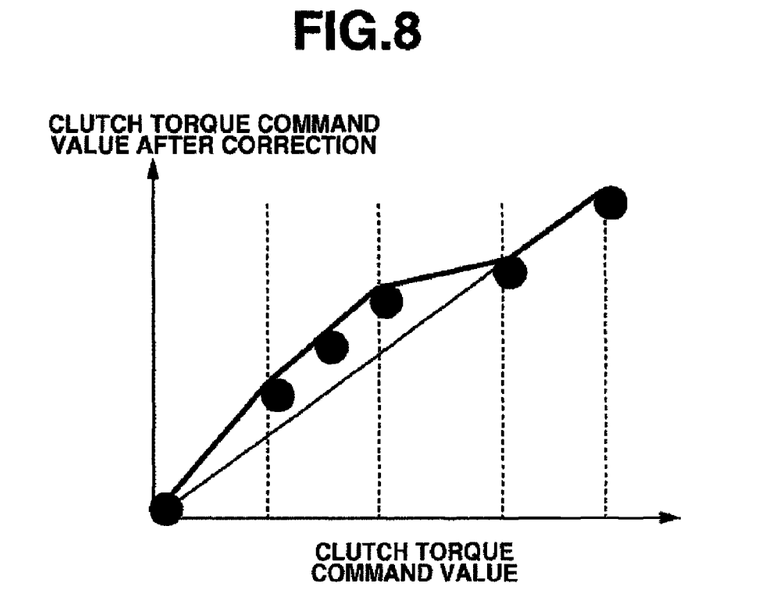
FIG. 8 is a correction map showing a second clutch engagement torque command value.

Step S209 corrects the command value of the second clutch engagement torque TC based on the current integral correction value. Then the control operation is finished. For example, where the second clutch engagement torque TC in the inertia phase is low, the correction is performed by using the graph shown in FIG. 8 for increasing the clutch torque command value.

Figure 9A:
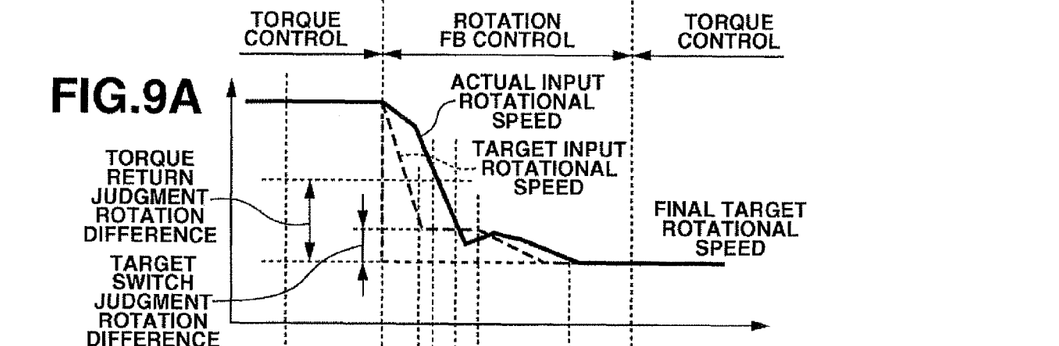
FIGS. 9A-9D are time charts of the second clutch engagement torque learning control according to one embodiment (upshift)
Figure 9B:
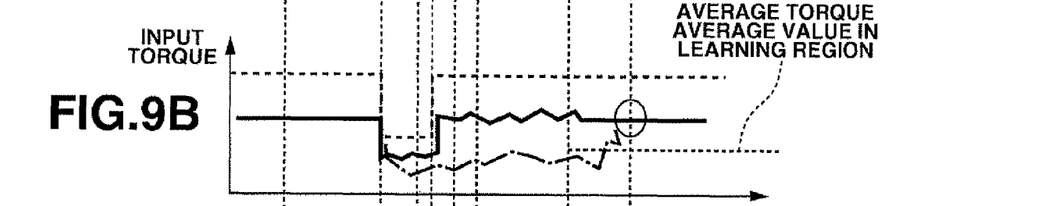
Figure 9C:
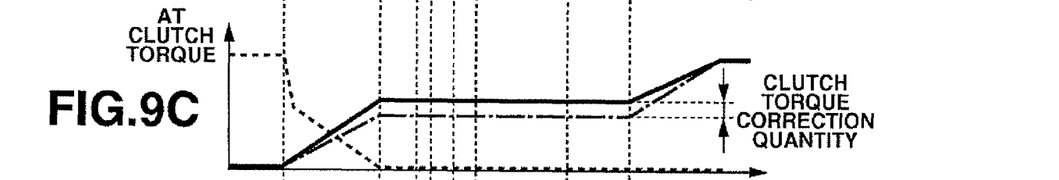
Figure 9D:
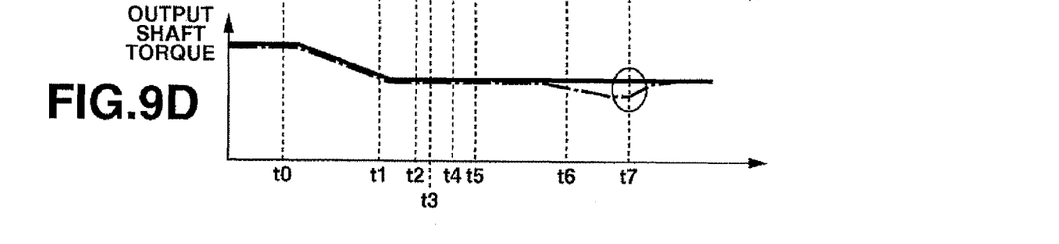

FIGS. 9A-9D are time charts of the torque control of the engine and motor-generator MG in the up-shift. FIG. 9A shows a torque variation of input shaft IN of automatic transmission AT. FIG. 9B shows variations of the torque of the engine and the torque of motor-generator MG. FIG. 9C shows variations of the frictional engagement element that is disengaged at the shift of automatic transmission AT and the frictional engagement element that is engaged at the shift of automatic transmission AT. FIG. 9D shows a variation of the torque of output shaft OUT of the automatic transmission AT.

Figure 10:
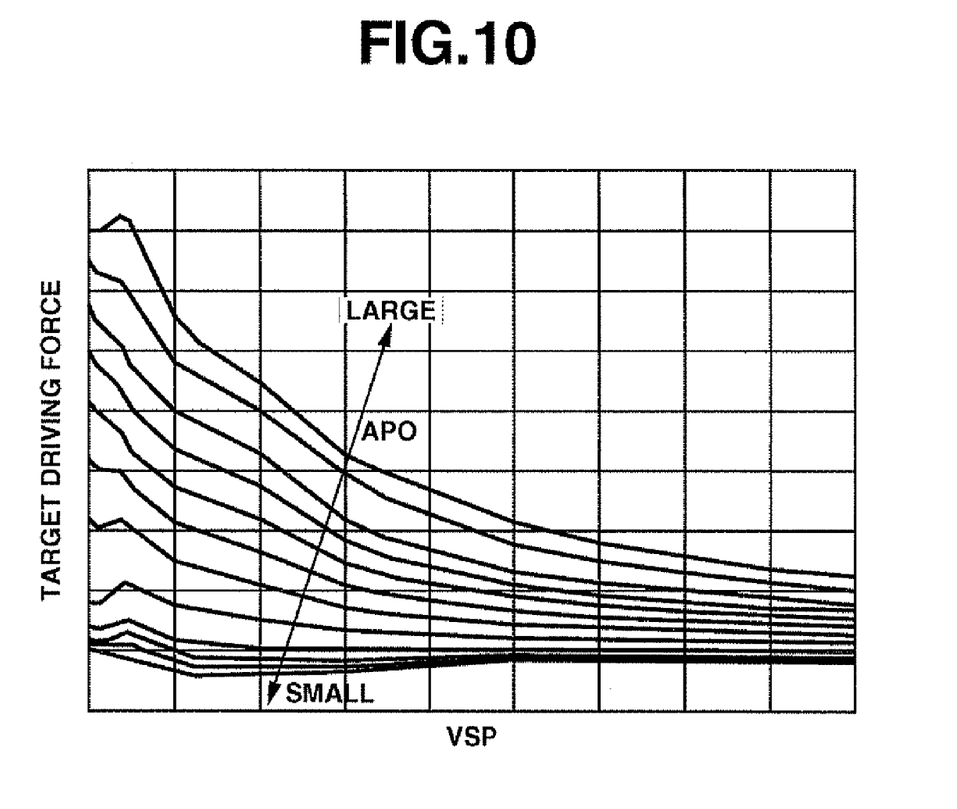
FIG. 10 is one example of a map of a target driving force used in a target driving force calculation.

At time t0, when the up-shift request is generated in automatic transmission AT, disengagement of the frictional engagement elements corresponding to the shift stage before the up-shift is started. Concurrently, engagement of the frictional engagement elements (second clutch CL2) corresponding to the shift stage after the up-shift is started. As shown in the time chart of FIG. 9C, after the engagement torque (broken line) of the frictional engagement element on the disengagement side is decreased to a clutch torque where the frictional engagement element is not slipped, and the clutch torque is gradually decreased to zero. The engagement torque (solid line) of the frictional engagement element on the engagement side is gradually increased to a predetermined clutch torque. The predetermined clutch torque is calculated in accordance with the engine torque and the motor torque and is set to a quantity corresponding to the engine torque and the motor torque input to input shaft IN in the torque phase after time t7 described below. The clutch switching control between the frictional engagement element on the disengagement side and the frictional engagement element on the engagement side is performed until time t1. At time t1, the engagement torque of the first clutch becomes substantially zero. The torque transmitted from input shaft IN to output shaft OUT is dominated by transmission by the clutch torque. That is, as shown in the time chart of FIG. 9D, at time t1 the torque of output shaft OUT is decreased to the quantity corresponding to the clutch torque. Between time t0 and time t1, the output shaft OUT is in the torque phase. The output torques of engine E and motor-generator MG are set so that the driving force input to automatic transmission AT becomes the required torque of the driver. As to the required torque of the driver, the target driving force is calculated from accelerator opening APO and vehicle speed VSP by using a map such as that shown in FIG. 10.

After time t1 processing proceeds from torque control of the motor-generator MG torque to correspond to the target torque to rotational speed control of the motor-generator MG to correspond to the target rotational speed. After time t1 the engagement torque of second clutch CL2 is held to a constant value. Moreover, the rate of change of the target input rotational speed becomes first ramp gradient $\alpha$, and the target input rotational speed is set to decrease at the constant rate. Moreover, the feedforward control of the engine torque is started, the map is checked in accordance with the shift (cf. FIG. 4), and the engine torque and the motor-generator torque are decreased. By decreasing the engine torque and the motor-generator torque, the rotational speed of input shaft IN is decreased to follow the target input rotational speed, and it is possible to decrease the inertia torque according to the variation of the rotational speed. The control to follow the target input rotational speed may be replaced by a method wherein the actual gear ratio follows the target gear ratio after the ratio between the input shaft and the output shaft is sensed.

For detection of the shift response by the driver, it is desirable if the rate of change of the rotational speed in the initial stage of the inertia phase is large. For decreasing the shift shock, it is desirable that the rate of change of the rotational speed at the completion of the inertia phase is low. Accordingly, the rate of change of the target input rotational speed is set to decrease with time, the shift response is improved, and the decrease of the shock is achieved. Specifically, at time t2 the actual value of the target input rotational speed becomes equal to the initial target rotational speed, and the target input rotational speed becomes the constant value.

At time t3 the difference between the final value of the target input rotational speed and the actual input rotational speed becomes equal to or lower than the torque return judgment rotational speed difference, and the feedforward control of the engine torque is finished. Consequently, the engine torque is returned to the quantity corresponding to the accelerator opening. The return timing of the engine torque is set early in consideration of the response delay of the engine torque, and accordingly it is possible to prevent undershoot of the actual rotational speed of transmission input shaft IN with respect to the final target rotational speed.

At time t4 the actual input rotational speed reaches the target input rotational speed. Nearly simultaneously, the motor-generator torque is returned to the quantity corresponding to the accelerator opening. Until time t7, the rotational speed feedback of the motor-generator MG is performed so that the actual rotational speed of transmission input shaft IN follows the target rotational speed.

After the target input rotational speed becomes the constant value at time t2, the target input rotational speed is held during the predetermined time period so that undershoot of the actual input rotational speed with respect to the target input rotational speed is prevented. It is possible to determine that the slip state of second clutch CL2 is sufficiently ensured when a constant time period elapses after the actual input rotational speed reaches the target input rotational speed. Moreover, this second ramp gradient $\beta$ is set smaller than the first ramp gradient $\alpha$ between time t1 and time t2. Specifically, at time t5 the time period (i.e., the elapsed time from time t4) after the actual input rotational speed reaches the target input rotational speed corresponds to the target switch judgment time period, and the target input rotational speed is decreased by second ramp gradient $\beta$. Accordingly, the rate of change of the target input rotational speed is set to decrease with time, and it is possible to improve both of the sensitivity of the shift response and the decrease of shift shock.

At time t6 the actual input rotational speed equals the target input rotational speed final value.

At time t7 the inertia phase is finished, and second clutch CL2 is completely engaged. Motor-generator MG proceeds from rotational speed control to torque control. After the transition to torque control, the engine torque and the motor torque are calculated in accordance with the required torque of the driver like in the manner before time t1. That is, between time t2 and time t7 during the inertia phase, the output torque is determined by the engagement torque of second clutch CL2. After time t7, the output torque is determined by the engine torque and the motor torque.

That is, in a case in which the second clutch engagement torque during the inertia phase is set to a small value, the motor-generator torque to follow the actual rotational speed of transmission input shaft IN to the target rotational speed is decreased as shown by the chain line in the time chart of FIG. 9C. Consequently, the motor-generator torque is suddenly increased after the transition to the torque phase at time t7, and shock is caused (as shown in a chain line in the time chart of FIG. 9B). This variation of the motor torque causes shift shock of the output shaft (as shown in a chain line in the time chart of FIG. 9D). In this embodiment, there is provided a torque correction section to correct the engagement torque of second clutch CL2, which is the frictional engagement element in automatic transmission AT, so that the engagement torque of second clutch CL2 before the completion of the inertia phase is substantially identical to the input torque of automatic transmission AT after the completion of the inertia phase.

The torque correction section includes a sensing section configured to sense a difference between the engagement torque of second clutch CL2 before the completion of the inertia phase at the shift and the input torque of automatic transmission AT after the completion of the inertia phase. The torque correction section also includes a learning control section configured to correct the engagement torque of second clutch CL2 to decrease the difference at the next shift.

Accordingly, it is possible to suppress the shock at the time of transition from the rotation feed back control region to the torque control region of motor-generator MG. Therefore, it is possible to provide a control apparatus of the driving system for a vehicle arranged to decrease shift shock generated by the complete engagement of second clutch CL2 at the completion of the inertia phase.

The learning control section is operated at the shift in each predetermined region of the input torque of automatic transmission AT. It is possible to further effectively perform the decrease of the shock by performing learning control.

Moreover, where the driving system for the vehicle includes an engine (first driving source) E, a motor-generator (second driving source) MG and a step automatic transmission AT arranged to attain a predetermined shift stage by the engagement of frictional engagement elements, the control apparatus of the driving system a target rotational speed generation section 120 configured to calculate a target input rotational speed of automatic transmission AT at the shift based on the driver's required driving force, a feedforward torque generation section 140 configured to perform feed forward control of the output torque of engine E at the shift based on the target input rotational speed and a feedback control section 130 configured to perform feedback control of the output torque of motor-generator MG at the shift so that the input rotational speed of automatic transmission AT follows the target input rotational speed.

Accordingly, even in the case in which the torque of the motor-generator is small with respect to the engine torque, the rough torque profile is made by the engine torque, and then feedback control is performed by the motor-generator torque. Consequently, there is provided a control apparatus of the vehicle driving system arranged to ensure the ability to follow the target input rotational speed of transmission AT. Hereinafter, each step is illustrated.

Target rotational speed generation section 120 is configured to calculate a target input rotational speed so that the rate of change of the target input rotational speed is set to decrease with time.

For detection of shift response by the driver, it is desirable that the rate of change of the rotational speed in the initial stage of the inertia phase is large. For decreasing shift shock, it is desirable that the rate of change of the rotational speed at the completion of the inertia phase is low. Accordingly, the rate of change of the target input rotational speed is set to decrease with time, and the sensitivity of the shift response is improved. Decrease of the shock is thus achieved.

Target rotational speed generation section 120 is configured to vary the target input rotational speed by a first ramp gradient α until the initial target rotational speed is larger than the final target rotational speed at the completion of the shift, to hold this target input rotational speed during the predetermined time period when the target input rotational speed reaches the initial target rotational speed, and then to vary the target input rotational speed by a second ramp gradient β to the final target rotational speed.

The target input rotational speed is held during the predetermined time period, so undershoot of the actual input rotational speed with respect to the target input rotational speed is prevented.

Target rotational speed generation section 120 is configured to set the initial target rotational speed in accordance with the shift. Accordingly, it is possible to appropriately set the initial target rotational speed in accordance with the shift.

Feedforward torque generation section 140 is configured to finish feedforward control when the difference between the input rotational speed of automatic transmission AT and the final target rotational speed becomes a predetermined rotational speed difference.

The return timing of the engine torque is set early in consideration of the response delay of the engine torque, and accordingly it is possible to prevent undershoot of the actual rotational speed of transmission input shaft IN with respect to the final target rotational speed.

Feedforward torque generation section 140 is configured to set the output torque of engine E in accordance with the rate of change of the target input rotational speed and with the request of the driving force by the driver.

Although the control apparatus according to the invention has been described above by reference to the embodiments, the invention is not limited to these embodiments. Modifications and variations are allowed.

Figure 11:
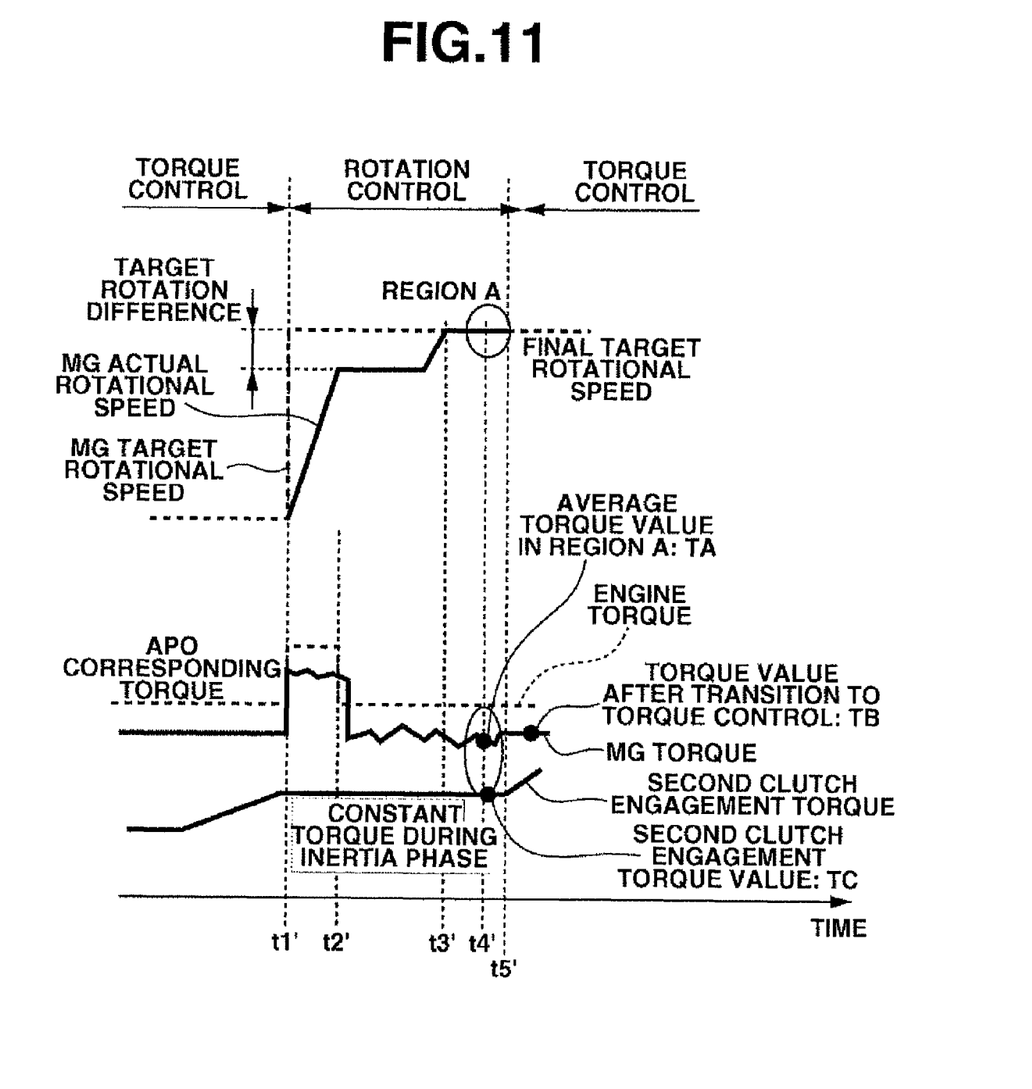
FIG. 11 is a time chart of the second clutch engagement torque learning control according to another embodiment (downshift).

For example, in the first embodiment, learning control of the engagement torque of second clutch CL2 at the upshift is performed. It is optionally performed at the downshift as shown in FIG. 11. FIG. 11 is substantially identical to FIG. 9 except that the target rotational speed, the torque of motor-generator MG and the engine torque are increased at time t1' for the downshift.

In the first embodiment, the invention is applied to the driving system of the hybrid vehicle. However, the invention can be used to decrease shift shock in an electric vehicle that runs only by a motor.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A driving system for a vehicle, comprising:
   a driving source;
   a step automatic transmission arranged to attain a predetermined shift state by selecting an engagement state of a frictional engagement element and to transmit a driving force of the driving source to driving wheels;
   a vehicle running state sensing device configured to sense a running state of the vehicle; and
   a control device configured to output a respective control command value to the driving source and the step automatic transmission in accordance with the running state, the control device including:
   a rotational speed control section configured to control a rotational speed of the driving source so that an input rotational speed of the step automatic transmission follows a target input rotational speed during an inertia phase during which the input rotational speed of the step automatic transmission varies in accordance with a shift;
   a frictional engagement force control section configured to control an engagement force of the frictional engagement element during the inertia phase;
   a driving force control section configured to control a driving force input to the step automatic transmission after the inertia phase in accordance with the running state;
   a driving force difference judgment section configured to judge whether or not a driving force difference input to the step automatic transmission that is equal to or greater than a predetermined value is generated before or after completion of the inertia phase; and
   a frictional engagement force correction section configured to selectively correct the engagement force so as to decrease the driving force difference when the driving force difference that is equal to or greater than the predetermined value is generated.

2. The driving system according to claim 1 wherein the frictional engagement force correction section comprises:
   a sensing section configured to sense a difference between the engagement force before the completion of the inertia phase and the driving force input to the step automatic transmission after the completion of the inertia phase; and a learning control section configured to selectively correct the engagement force at a next shift so as to decrease the difference.

3. The driving system according to claim 2 wherein the learning control section is configured to be executed at each shift stage.

4. The driving system according to claim 2 wherein the learning control section is configured to be executed only when the driving force generated by the driving source is equal to or greater than a predetermined value.

5. A control apparatus of a driving system for a vehicle including a driving source and a step automatic transmission arranged to attain a predetermined shift state by selecting an engagement state of a frictional engagement element and to transmit a driving force of the driving source to driving wheels, the apparatus comprising:
  means for outputting a respective control command value to the driving source and the step automatic transmission in accordance with the running state;
  means for controlling a rotational speed of the driving source so that an input rotational speed of the step automatic transmission follows a target input rotational speed during an inertia phase during which the input rotational speed of the step automatic transmission varies in accordance with a shift;
  means for controlling an engagement force of the frictional engagement element during the inertia phase;
  means for controlling a driving force input to the step automatic transmission after the inertia phase in accordance with a sensed running state;
  means for judging whether or not a driving force difference input to the step automatic transmission that is equal to or greater than a predetermined value is generated before or after completion of the inertia phase; and
  means for selectively correcting the engagement force so as to decrease the driving force difference when the driving force difference that is equal to or greater than the predetermined value is generated.

6. The apparatus according to claim 5, further comprising: means for sensing the sensed running state of the vehicle.

7. The apparatus according to claim 5 wherein the selectively correcting means comprises:
  means for sensing a difference between the engagement force before the completion of the inertia phase and the driving force input to the step automatic transmission after the completion of the inertia phase; and
  means for selectively correcting the engagement force at a next shift so as to decrease the difference.

8. The apparatus according to claim 7 wherein the means for selectively correcting the engagement force at a next shift so as to decrease the difference comprises means for decreasing the difference at each shift stage.

9. The apparatus according to claim 7 wherein the means for selectively correcting the engagement force at a next shift so as to decrease the difference is configured to be executed only when the driving force generated by the driving source is equal to or greater than a predetermined value.

10. A control method of a driving system for a vehicle including a driving source and a step automatic transmission arranged to attain a predetermined shift state by selecting an engagement state of a frictional engagement element and to transmit a driving force of the driving source to driving wheels, the method comprising:
  outputting a respective control command value to the driving source and the step automatic transmission in accordance with the running state;
  controlling a rotational speed of the driving source so that an input rotational speed of the step automatic transmission follows a target input rotational speed during an inertia phase during which the input rotational speed of the step automatic transmission varies in accordance with a shift;
  controlling an engagement force of the frictional engagement element during the inertia phase;
  controlling a driving force input to the step automatic transmission after the inertia phase in accordance with a sensed running state;
  judging whether or not a driving force difference input to the step automatic transmission that is equal to or greater than a predetermined value is generated before or after completion of the inertia phase; and
  selectively correcting the engagement force so as to decrease the driving force difference when the driving force difference that is equal to or greater than the predetermined value is generated.

11. The method according to claim 10, further comprising: sensing the sensed running state of the vehicle.

12. The method according to claim 10 wherein selectively correcting the engagement force comprises:
  sensing a difference between the engagement force before the completion of the inertia phase and the driving force input to the step automatic transmission after the completion of the inertia phase; and
  selectively correcting the engagement force at a next shift so as to decrease the difference.

13. The method according to claim 12 wherein selectively correcting the engagement force at a next shift so as to decrease the difference comprises means for decreasing the difference at each shift stage.

14. The method according to claim 12 wherein selectively correcting the engagement force at a next shift so as to decrease the difference comprises correcting the engagement force at the next shift only when the driving force generated by the driving source is equal to or greater than a predetermined value, 15. The driving system according to claim 1 wherein a rate of change of the target input rotational speed is set to decrease over time.

16. The driving system according to claim 1 wherein the rotational speed control section is further configured to perform feed forward control of an engine output torque at the shift based on the target input rotational speed, the engine output torque being a target torque profile during the inertia phase, and to perform feedback control of an output torque of the motor-generator at the shift so that the input rotational speed of the automatic transmission follows the target input rotational speed.

17. The apparatus according to claim 5, wherein a rate of change of the target input rotational speed is set to decrease over time.

18. The apparatus according to claim 5, wherein the means for controlling a rotational speed of the driving source includes means for performing feed forward control of an engine output torque at the shift based on the target input rotational speed, the engine output torque being a target torque profile during the inertia phase, and means for performing feedback control of an output torque of the motor-generator at the shift so that the input rotational speed of the automatic transmission follows the target input rotational speed.

19. The method according to claim 10, wherein a rate of change of the target input rotational speed is set to decrease over time.

20. The method according to claim 10, wherein controlling the rotational speed of the driving source further comprises:
performing feed forward control of an engine output torque at the shift based on the target input rotational speed, the engine output torque being a target torque profile during the inertia phase; and performing feedback control of an output torque of the motor-generator at the shift so that the input rotational speed of the automatic transmission follows the target input rotational speed.

* * * * *